United States Patent [19]

Boeckmann

[11] Patent Number: 4,790,126

[45] Date of Patent: Dec. 13, 1988

[54] FILL AND SEAL MACHINE FOR RECLOSABLE BAGS

[75] Inventor: Hugo Boeckmann, Arlington Heights, Ill.

[73] Assignee: Minigrip Inc., Orangeburg, N.Y.

[21] Appl. No.: 67,480

[22] Filed: Jun. 29, 1987

[51] Int. Cl.[4] .............................................. B65B 9/08
[52] U.S. Cl. ...................................... 53/451; 53/552; 226/197; 493/213
[58] Field of Search ............... 493/213, 394, 459, 461; 53/373, 451, 551, 552, 450; 226/197

[56] References Cited

U.S. PATENT DOCUMENTS

| 1,237,595 | 8/1917 | Wood | 226/197 |
|---|---|---|---|
| 2,751,732 | 6/1956 | Woppman | 53/554 |
| 3,815,317 | 6/1974 | Toss | 53/451 |
| 4,355,494 | 10/1982 | Tilman | 53/416 |
| 4,534,159 | 8/1985 | Kelly | 53/451 X |
| 4,589,145 | 5/1986 | Van Erden et al. | 53/450 X |
| 4,617,683 | 10/1986 | Christoff | 53/416 X |

Primary Examiner—James F. Coan
Assistant Examiner—Steven P. Weihrouch
Attorney, Agent, or Firm—Hill, Van Santen, Steadman & Simpson

[57] ABSTRACT

A method and apparatus for form, fill, and seal operation using bag-making sheet material having complementary male and female reclosable profiles includes sheet guide and tensioning devices to ensure continuous, effective packaging. The inventive features address the presence of tracking problems in sheet feed using bag material having profiles and being of a laminated type, and serve to ensure wrinkle-free, acceptable sealing of bag edges.

10 Claims, 5 Drawing Sheets

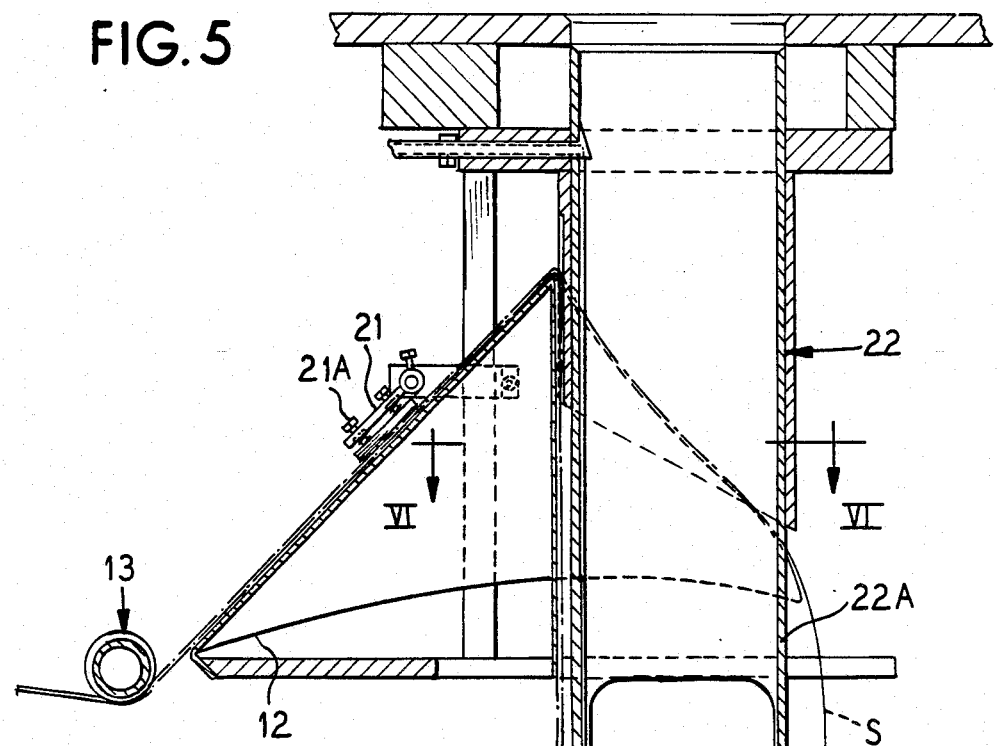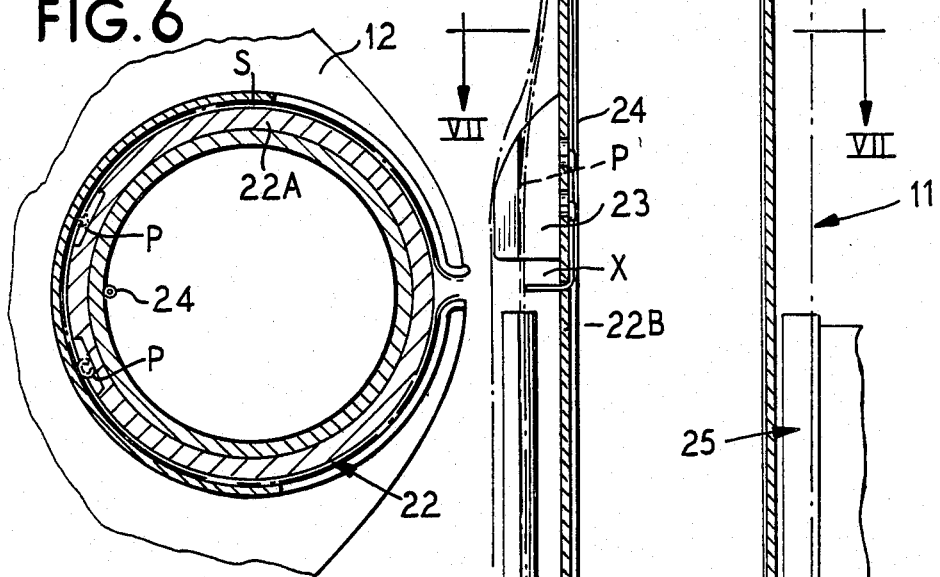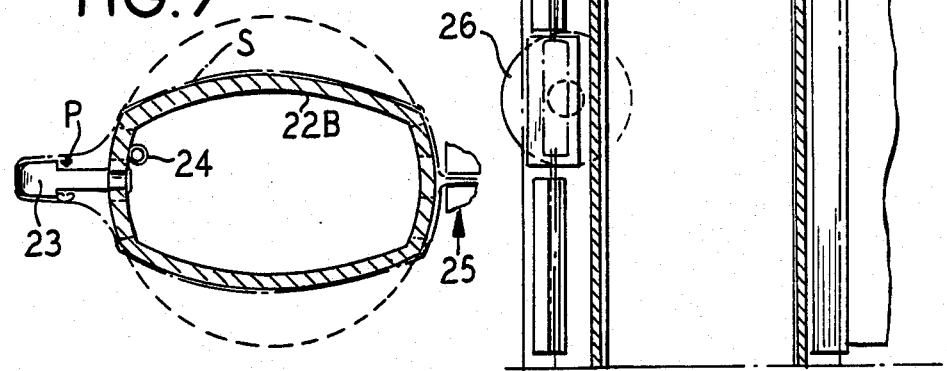

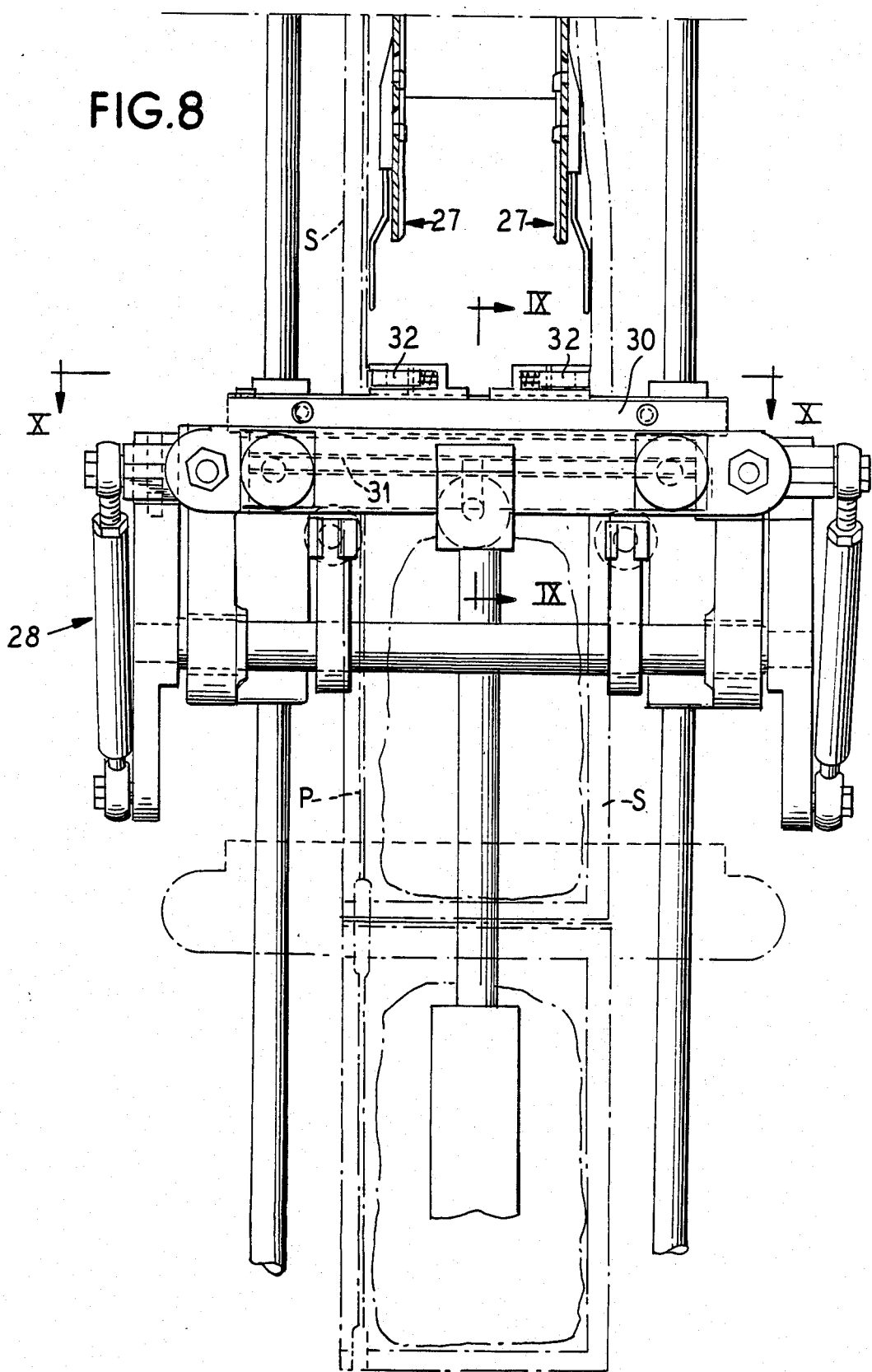

FILL AND SEAL MACHINE FOR RECLOSABLE BAGS

BACKGROUND OF THE INVENTION

Field of the Invention

The invention relates to improvements in a form/fill/seal packaging machine in which a bag making plastic sheet having with separable reclosable fastener strips is formed into separately sealed and locked bag sections containing fill product.

Reference is made to U.S. Pat. No. 4,355,494 for background and details of a form/fill/seal machine for reclosable fastener strip bags for which the subject invention improvements are made.

The present invention serves to improve the production of reclosable bags with a product material therein by making a form/fill/seal machine more reliable and readily effective in handling bag making plastic sheet having reclosable fastener strips. Other benefits and advantages resulting from the invention will be recognized by those familiar with the field of reclosable bag packaging and previously known form/fill/seal machinery for bag making material.

SUMMARY OF THE INVENTION

Bag sheet material or film, with zipper profiles attached equidistant from the film edge in the direction of feed, is paid-off from a spool to a form/fill/seal machine. The payoff section is designed to feed open profile film (or possibly closed profile film) for processing in the machine. Guide rolls carry the film to a 90° turnover section. From here the film enters a forming shoulder which centers and wraps the film around a vertical feed tube. Feed tube guide attachments maintain straightness of the film while it is being advanced by a vertically movable sealer having sealing jaws. The sealing jaws apply a bottom and top seal to consecutive bags. The open zipper profile is closed during the indexing period of the cycle, while a rest period allows side sealing and ultrasonic spotwelding of the engaged profile sections. The filled and formed bag is separated at the bottom of the vertical stroke of the movable sealer by a cut-off knife timed to maintain accurate bag length.

Inert gas is blown into the product section and the head section separated by the zipper at timed intervals or at a constant rate during the process.

BRIEF DESCRIPTION OF THE DRAWINGS

FIG. 5 is a side elevation cross-sectional view of the feed tube upper portion.

FIG. 6 is a cross-sectional view taken along lines VI—VI of FIG. 5.

FIG. 7 is a cross-sectional view taken along lines VII—VII of FIG. 5.

FIG. 8 is a side elevational view of the feed tube lower portion and bag fill and separation section.

DESCRIPTION OF THE PREFERRED EMBODIMENTS

Figure 1:
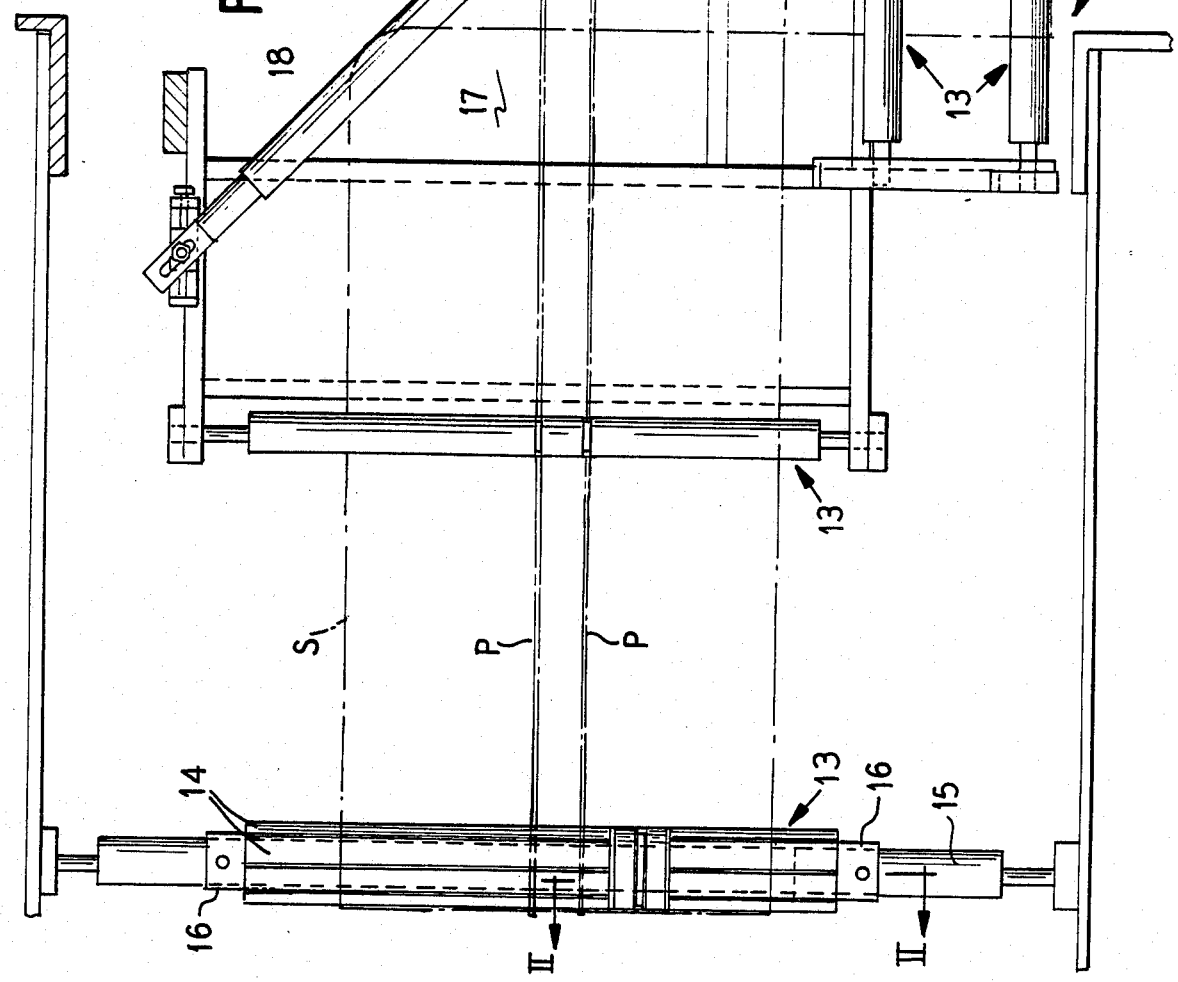
FIG. 1 is a partial top elevational view showing the sheet feed section for the form/fill/seal machine of the present invention.

FIG. 1 shows a sheet feed section 10 for the bag forming apparatus of the invention. Like the bag forming apparatus disclosed in U.S. Pat. No. 4,355,494, plastic laminated bag making sheet material formed with interlockable, reclosable zipper profiles is paid-off from a spool (not shown) and conducted over grooved guide rolls to a vertical feed tube section 11 having a shaping shoulder 12 at its upper end as shown in FIG. 5. Unlike the system disclosed in the '494 patent, however, the present invention contemplates plastic laminated bag sheet material S with center-located male and female profiles P requiring a side and bottom seal arrangement to form the bag.

Figure 2:
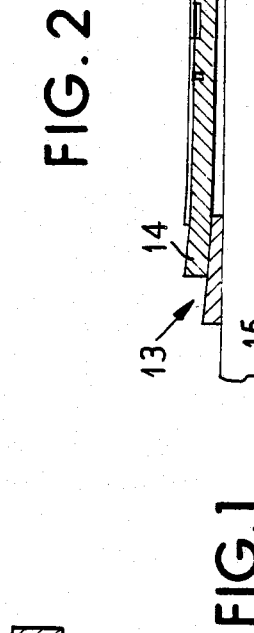
FIG. 2 is a cross-section view of an expandable guide roller taken along lines II—II of FIG. 1.

The bag sheet material S is passed from the spool about a first set of guide rolls 13. At least one of these guide rolls is preferably formed with a variable diameter circumferential sheath to maintain proper tension of the sheet material payoff. As shown in FIGS. 1 and 2, the outer sheath of an expandable guide roll is a hollow sleeve of flexible arc sections 14 disposed concentrically about a roll shaft 15 by wedge-shaped rings 16 coaxial with the shaft. The rings 16 may be adjustably disposed on the shaft to increase the roll diameter at the sheet material edges to compensate for possible material contraction adjacent the profile center portion of the sheet material (which can occur as the result of the extrusion process of the profile strips when the sheet material is made).

Figure 3:
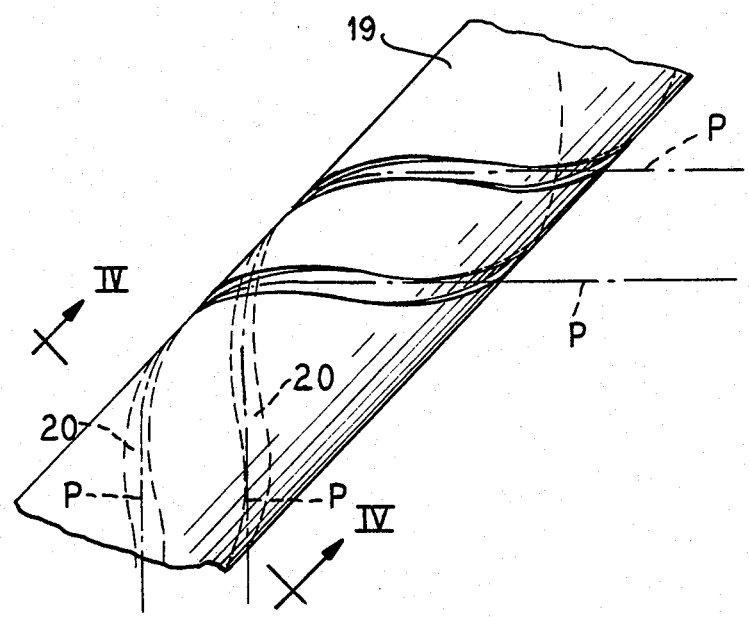
FIG. 3 is a partial perspective view of the spirally grooved guide portion of the turn bar.
Figure 4:
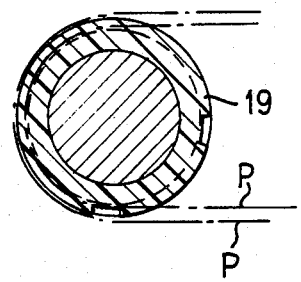
FIG. 4 is a cross-section view taken along lines IV—IV of FIG. 3.

The bag sheet material S passes from the first set of guide rolls 13 through a 90° turnover section 17 having a stationary turnover bar 18 disposed at approximately 45° to the direction of movement of the sheet to and from it and over which the sheet material passes. A turnover bar is commonly used in the packaging industry; however, since plastic laminated sheet material frequently has loose edges and since the sheet material here has relatively heavy profiles sections, a tracking problem could arise. To rectify this, the turnover bar 18 is formed with a special spirally grooved guide section 19 for maintaining and controlling tracking. As shown in detail in FIGS. 3 and 4, the profiles P enter the spiral grooves 20 of the guide section 19 and are guided by the grooves through the sheet turn about the bar 18. The guide section enables the sheet material to effectively change its direction of movement. A slight turn adjustment of the stationary bar 18 shifts the groove track-line of the guide section 19 to different positions, if necessary, should the profile location vary among different sheet spools.

The turned sheet is conducted over further guide rolls 13 and doubles back over the turnover section 17 to around the shaping shoulder 12. With reference to FIG. 5, the shaping shoulder 12 is configured as that depicted in U.S. Pat. No. 4,355,494. A spring-loaded guide plate device 21 is mounted at the lead side outer surface of the shoulder 12 for channeling one or both of the fastener profile strips P through a groove. The spring loading in the guide plate device 21 is preferably adjustable by means of screws 21A to control and maintain tension on the sheet material S. The sheet material is passed around the shaping shoulder and then downwardly inside the hollow of the shoulder as a tubular form intermediate product about a vertically disposed feed tube 22.

The section 22A of the feed tube 22 within the hollow of the shoulder 12 and slightly beneath the shoulder is cylindrically shaped as shown in FIG. 6. The lower section 22B of the feed tube 22 changes configuration to a relatively polygonal shape, as shown in FIG. 7.

Mounted parallel along the feed tube 22 is a profile closing section 23 formed by a stationary grooved guide which gradually leads the male and female complementary profiles into engagement upon reaching the region X as shown in FIG. 5. Inert gas, such as carbon dioxide or nitrogen, is preferably directed under pressure at region X from a blow pipe 24 into a bag head section adjacent the profiles. Such inert gas is also blown into the feed tube 22 to evacuate the product section interior of the bag being formed. The inert gas may be blown into the bag sections at timed intervals or at a constant rate during the process.

On the other side of the feed tube 22 mounted parallel to the tube is a pair of heat sealing plates 25. The opposed free edges of the sheet material S are brought together in the space between the sealing plates. During a rest period in the movement of the sheet material a side seal for the bag being formed is made by the plates 25. Also during this rest period ultrasonic spotwelding of the now engaged profile strips occurs by means of an ultrasonic spotwelder 26, shown in FIG. 5. The spotwelds are formed at the opposed ends of the reclosable profile strips for the bag being formed to assure leakproof bags for use with perishable products. Inasmuch as the profiles are engaged, the spot welding holds them in the interengaged relationship at the ends, which will be the sides of each of the bag tops. As will be apparent, because the strips are held in engagement at their ends, it will be easy for the user to push the profiles together along their length to close the bag.

With reference to FIG. 8, downstream of the sealing plates 25 and spotwelder 26 in the direction of movement of the sheet material out from the feed tube the tubular form intermediate product passes over guide fingers 27 for holding the sheet form generally tubular. A vertically movable sealer 28 disposed beneath the guide fingers. Similarly with the apparatus disclosed in U.S. Pat. No. 4,355,494, the movable sealer 28 contains a pair of transverse heat sealing bars 29 and 30 which are suitably movable to clamp the tubular form sheet material for a vertical stroke of the sheet material S whereupon a transverse seal is applied to the bag material. The bars 29 and 30 then release the material and the sealer 28 moves back upward to commence a subsequent downward stroke. The rest period in the movement of sheet material S through the form/fill/seal machine occurs during this back upward movement of the sealer. Fill product is passed through the feed tube into the bag being formed after the transverse seal is applied and during the rest period. This transverse seal on the tubular form serves to close the open bottom and top ends of adjacent bags being formed. The sealer 28 contains a cut-off knife 31 which passes across the space between the bars 29 and 30 at the end of the downstroke of the sealer 28 after the transverse seal has formed to divide a lower finished bag from a next adjacent upper bag to be filled.

Figure 9:
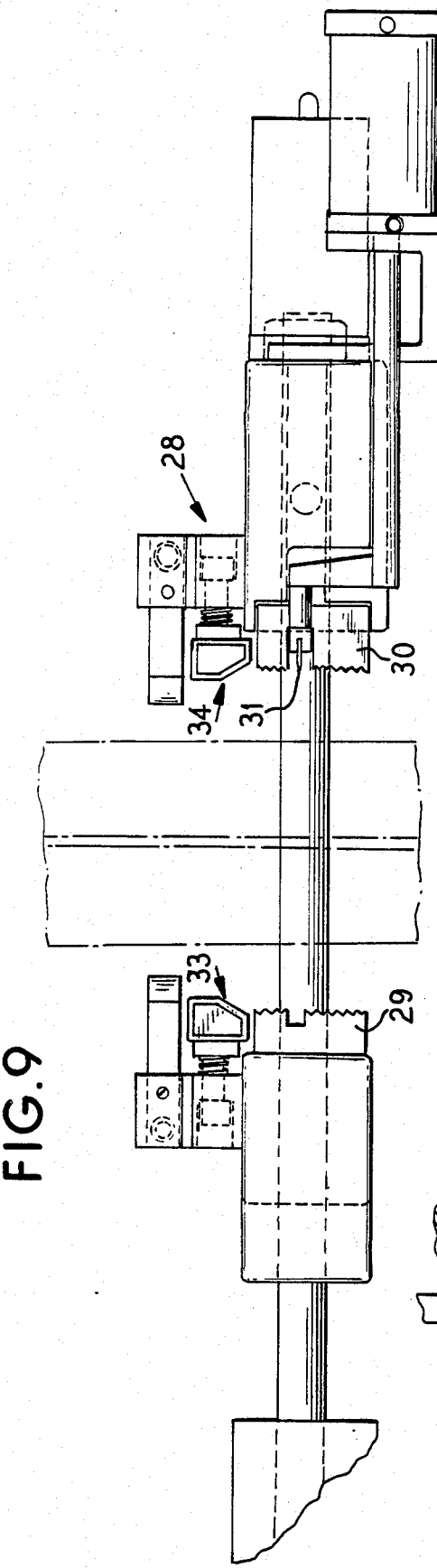
FIG. 9 is a cross-sectional view taken along lines IX—IX of FIG. 8.
Figure 10:
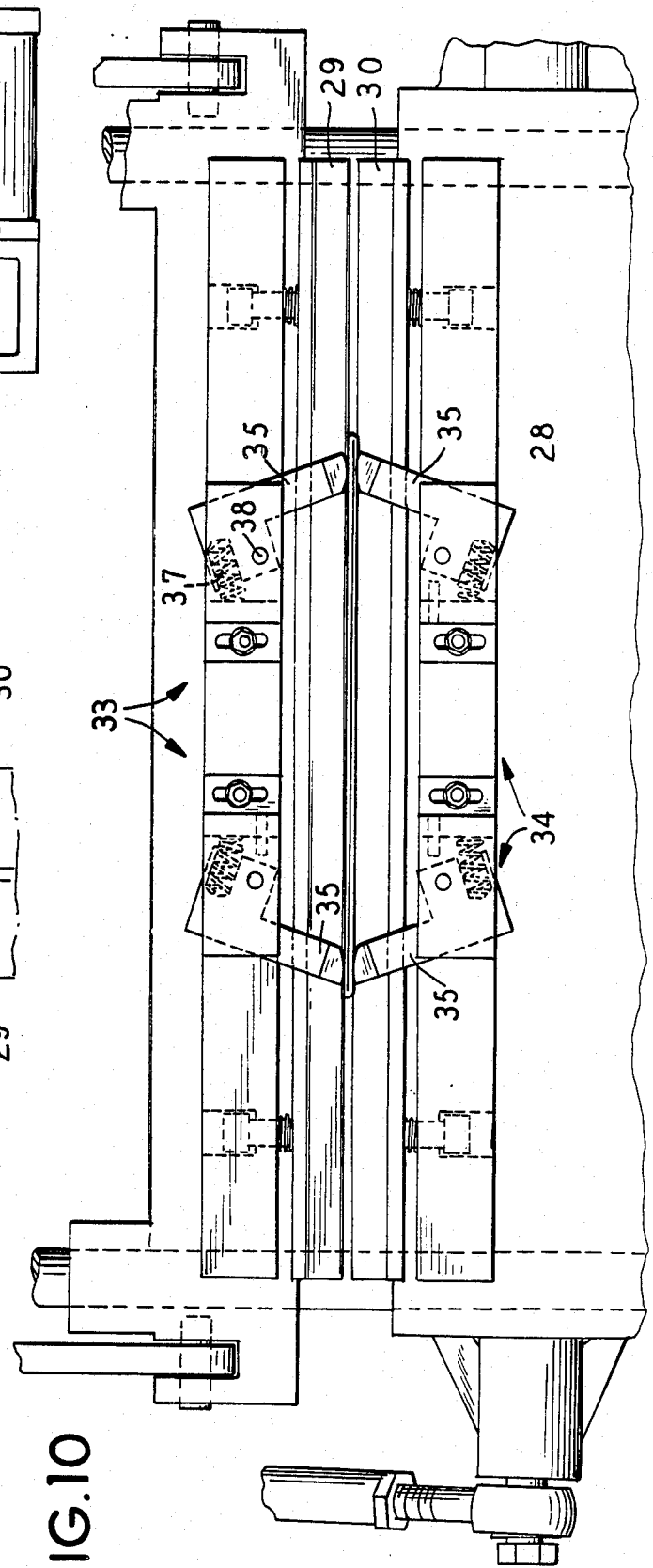
FIG. 10 is a cross-sectional view taken along lines X—X of FIG. 8.

In contrast to the device described in U.S. Pat. No. 4,355,494, there is mounted on top of the sealing bars 29 and 30 opposed spring loaded clamps 32 for acting on the tubular sheet material as shown in FIG. 8 to distribute the pull-load on the pay-off of sheet material more uniformly. This is necessary since the pull-load on the profile sections will otherwise differ from the less thick remaining portions of the sheet material. Also, as shown in FIGS. 9–10, pairs of spring loaded pivotal spreader links 33 and 34 are respectively attached directly on top of each of the sealing bars 29 and 30.

Each spreader link has an arm portion 35 disposed on a pivot pin 36 and biased by spring means 37 for engagement with the sheet material extending in the space between the sealing bars 29 and 30. Each spreader link acts together with a spreader link disposed on the other sealing bar to engage the sheet material between their arms. The opposed spreader link arms on the different sealing bars 29 and 30 actuate each other on contact through the sheet material and stretch the bag being formed transversely, as shown in FIG. 10, before the transverse seal is applied. The action of the spreader links 33 and 34 ensures a wrinkle-free, acceptable weld seal on the bag edges.

The present invention enhances previously known vertical form/fill/seal packaging operation to permit effective, reliable continuous operation using bag sheet material having reclosable fastener profile means, including laminated sheet material. The contribution to the art by this invention also includes those variations of an engineering or design type which employ the principles disclosed herein.

What is claimed is:

1. In a form/fill/seal packaging machine for making product-containing bags from a continuous length of sheet material having lengthwise directed male and female reclosable fastener strips, said machine having means for effecting intermittent advancement of said sheet material, means for sealing free edges of said bags, and means for interlocking said male and female fastener strips during formation of said bags, improvement comprising:

a spotweld means for applying a spotweld of facing sheet material portions at the side edges of said interlocked fastener strips for each bag, and means for activating said spotweld means during dwell periods between advancements of said sheet material prior to the completion of formation of the product-containing bag so that the spot weld will hold the fastener strip interlocked at the bag sides and the strip can be separated and again interlocked between the bag side edges.

2. The improvement of claim 1, further comprising: a stationary bar over which said sheet material passes
   to change its lengthwise direction of movement from a first direction of feed towards said bar to a different second direction of delivery from said bar, said bar having its lengthwise axis disposed at an angle offset from the first and the second directions, and a guide portion on said bar having at least one spirally wound groove for receiving fastener strip therein during movement of said sheet material over said bar.

3. The improvement of claim 1, further comprising:
   two pairs of pivot arm means respectively disposed on a pair of carriers between which said sheet material passes, said carriers disposed for movement towards and away from each other, each arm means of each pair facing across said sheet material with one arm means of the other pair, and each said arm means being biased towards said sheet material, such that said facing arm means together engage said sheet material and actuate each other on contact with said sheet material to stretch said sheet material transversely in preparation for application of a transverse seal of bag free edges.

4. In a form/fill/seal packaging machine for making bags from a continuous length of sheet material having lengthwise directed male and female reclosable fastener strips, an improvement for effective handling of said sheet material moving through said machine comprising:
 a stationary bar over which said sheet material passes to change its lengthwise direction of movement from a first direction of feed towards said bar to a different second direction of delivery from said bar, said bar having its lengthwise axis disposed at an angle offset from the first and the second directions, and a guide portion on said bar having at least one spirally wound groove for receiving fastener strip therein during movement of said sheet material over said bar.

5. The apparatus of claim 4, wherein said fastener strips are open from one another on said sheet material and respective guide portion grooves separately receive said fastener strips therein.

6. The apparatus of claim 4, wherein said bar axis is disposed at an angle approximately 45° offset from the first and the second directions.

7. In a form/fill/seal packaging machine for making bags from a continuous length of sheet material having lengthwise directed male and female reclosable fastener strips, an improvement for effective handling of said sheet material moving through said machine comprising:
 a stationary bar over which said sheet material passes to change its lengthwise direction of movement from a first direction of feed towards said bar to a different second direction of delivery from said bar, said bar having its lengthwise axis disposed at an angle offset from the first and second directions, a guide portion on said bar having at least one spirally wound groove for receiving fastener strip therein during movement of said sheet material over said bar, and means for turning the guide portion about said bar axis to shift the transverse disposition of said grooves relative to said sheet material being fed to said bar.

8. In a form/fill/seal packaging machine for making product-containing bags from a continuous length of sheet material having lengthwise directed male and female reclosable fastener strips, said machine having means for effecting intermittent advancement of said sheet material, means for sealing free edges of said bags, and means for interlocking said male and female fastener strips during formation of said bags, improvement comprising:
 two pairs of pivotal arm means respectively disposed on a pair of carriers between which said sheet material passes, said carriers disposed for movement towards and away from each other, each arm means of each pair facing across said sheet material with one arm means of the other pair, and each said arm means being biased towards said sheet material, such that said facing arm means together engage said sheet material and actuate each other on contact with said sheet material to stretch said sheet material transversely in preparation for application of a transverse seal of bag free edges, said arm means having convex material engaging faces to have rolling contact with the material.

9. The improvement of claim 8, wherein said carriers include heat sealing means for effecting said transverse seal.

10. A method for making product-containing bags from a continuous length of sheet material having lengthwise directed male and female reclosable fastener strips in a form/fill/seal machine having means for effecting intermittent advancement of said sheet material, means for sealing free edges of said bags, and means for interlocking said male and female fastener strips during formation of said bags, including the steps of:
 interlocking said male and female fastener strips,
 spotwelding together facing sheet material portions at ends of said interlocked fastener strips at the side edges for each said bag prior to the completion of the formation of the product-containing bag so that the interlocked fastener strips will be held in interlocking relationship at the ends of the fastener strips and the fastener strips can be separated and interlocked between the sides edges of the bag, and
 stretching facing free edges of said sheet material before forming forming a free edge seal on said bag.

* * * * *